March 17, 1925.
C. I. HALL
OVEN THERMOMETER
Filed Nov. 12, 1920
1,530,258
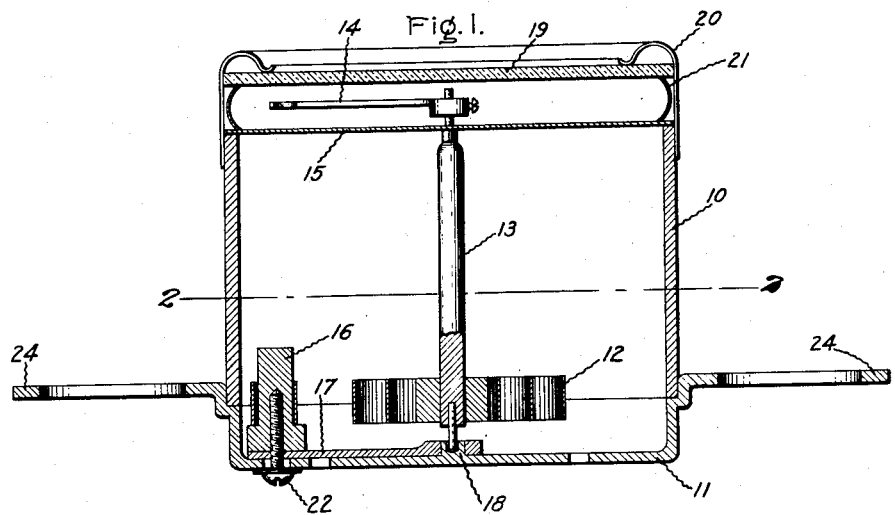
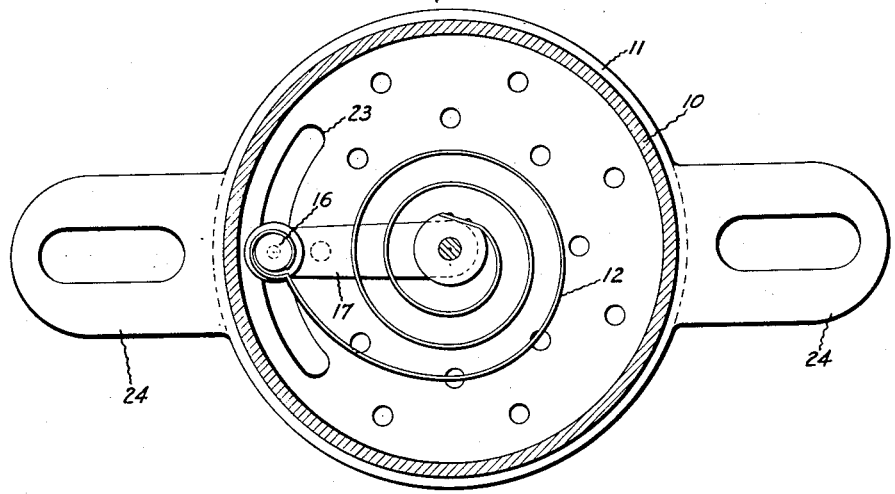
Inventor:
Chester I. Hall,
by (signature)
His Attorney.

Patented Mar. 17, 1925.

1,530,258

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

OVEN THERMOMETER.

Application filed November 12, 1920. Serial No. 423,701.

*To all whom it may concern:*

Be it known that I, CHESTER I. HALL, a citizen of the United States, residing at Fort Wayne, in the county of Allen, State of Indiana, have invented certain new and useful Improvements in Oven Thermometers, of which the following is a specification.

My invention relates to oven thermometers and has for its object the provision of means whereby the temperature of an oven may be indicated in a simple, reliable and efficient manner.

More specifically my invention relates to thermometers for indicating the temperature of ovens although it has other applications. A great deal of trouble has been experienced with oven thermometers due to the fact that they have heretofore been provided with gearing or leverage ratios between the prime mover and the indicating device and are therefore subject to frictional effects and inaccuracies, such as lost motion, due to improper machining and fitting of the parts. An excessive time lag has also been experienced due to the practice of so attaching oven thermometers that they are practically an integral part of the oven door and are affected by the temperature of the oven by conduction through the oven door. This causes the thermometer to have a time lag often of considerable duration before the temperature of the air at the center of the oven is indicated.

In carrying out my invention, I use a thermostatic metal element which is attached directly to the indicator thus eliminating all gear and lever connections, and I mount the thermostatic element in a perforated casing which projects into the oven through the inner lining of the same thus exposing the thermostatic element directly to the temperature of the air in the oven. By constructing my thermometer in this manner I obtain a device which is accurate and reliable and which will respond to the temperature of the air in the oven with a time lag of less than two minutes.

I also provide a zero adjustment which is easily accessible either before or after the device is mounted in the oven.

The construction of my device permits the use of a very long equicrescent scale thereby obtaining greater legibility as well as indications of smaller temperature variations.

Other objects and features of my invention will appear in the course of the following specification in which I have shown my invention embodied in concrete form for the purpose of illustration.

Referring to the drawing, Fig. 1 shows a side view of my thermometer in section, and Fig. 2 is a section view along the line 2—2 of Fig. 1.

Referring to the drawings, a thermostatic metal element 12 in the form of a spiral is mounted in a casing consisting of a cylindrical portion 10 attached at the lower end to a perforated base 11 and provided at the upper end with a scale 15 calibrated in degrees. One end of the thermostatic element is looped loosely around a supporting pin 16 which is constrained to be moved in an arc about bearing 18 by means of a strip 17 attached thereto and pivoted at the point 18. The pin 16 is held in position by means of a screw 22 which may be moved in an opening or slot 23 in the base for the purpose of adjusting the position of the pin. The other end of the thermostatic element is rigidly attached to a pointer staff 13 which is rotatably supported on the base at central bearing 18 and projects through the center of the calibrated scale 15. The upper end of the pointer staff 13 carries a pointer 14 arranged to move over the calibrated scale. A glass protecting face 19 is attached to the cylindrical portion 10 by means of metal rings 20 and 21 in a well known manner. The casing is provided with projecting ears 24 situated a short distance above the base, for the purpose of attaching the device to the oven.

As thus constructed the thermometer is adapted to be attached to the oven door with the cylindrical portion 10 of the casing extending through the wall of the oven and with the perforated base portion 11 projecting a short distance within the oven. The calibrated scale is thus exposed so as to be read from without the oven and the thermostatic element is in direct contact with the air in the oven by means of the perforations.

It will be seen that by using a thermostatic element in the shape of a spiral I am enabled to connect the thermostatic element directly to the indicating device. Upon changes of temperature the thermostatic element will be affected in such a manner that the pointer staff will be turned in one direction or the other, thus moving the pointer over the scale and giving an indication of the temperature in the oven.

A thermostatic element of this character will give a wide range of movement of the indicating device, and I am thereby enabled to use a calibrated scale having relatively large increments. The scale is thus made more legible and smaller changes of temperature can be indicated upon it.

The pin 16 is so arranged that it may be loosened by means of screw 22 and moved to adjust the zero calibration of the instrument at any time either before or after the instrument is mounted in the oven.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. An oven thermometer comprising a casing, indicating means carried by said casing, a thermostatic element operatively connected to said indicating means, an arm pivoted in said casing forming an adjustable support for said thermostatic element, there being an arcuate slot in said casing, and clamping means for said arm extending through said slot and accessible from the exterior of said casing.

2. An oven thermometer comprising a casing, a pointer staff rotatably mounted in said casing, a pointer carried by said staff, a spiral thermostatic element having one end secured to said staff, an arm having one end secured to the other end of said thermostatic element and pivoted about the axis of rotation of said staff whereby said thermostatic element may be adjusted to effect the zero setting of said pointer, there being an arcuate slot in said casing, and a clamping screw for said arm extending through said slot and accessible from the exterior of said casing.

In witness whereof, I have hereunto set my hand this 8 day of Nov., 1920.

CHESTER I. HALL.